US009203920B2

(12) United States Patent
Liu et al.

(10) Patent No.: US 9,203,920 B2
(45) Date of Patent: Dec. 1, 2015

(54) METHOD AND NODE FOR AUTOMATICALLY EXCHANGING NETWORK SERVICE PROVIDER INFORMATION

(75) Inventors: Di Liu, Shanghai (CN); Xiao Li, Shanghai (CN); Ruth Pallares Del Egido, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 323 days.

(21) Appl. No.: 13/603,630

(22) Filed: Sep. 5, 2012

(65) Prior Publication Data

US 2014/0068025 A1 Mar. 6, 2014

(30) Foreign Application Priority Data

Aug. 29, 2012 (WO) ................ PCT/CN2012/080702

(51) Int. Cl.
*G06F 15/177* (2006.01)
*H04L 29/08* (2006.01)

(52) U.S. Cl.
CPC .............. *H04L 67/28* (2013.01); *H04L 67/327* (2013.01)

(58) Field of Classification Search
CPC .............................. H04L 67/327; H04L 67/28
USPC .................................................. 709/220, 222
See application file for complete search history.

(56) References Cited

U.S. PATENT DOCUMENTS

| 6,571,277 | B1 * | 5/2003 | Daniels-Barnes | ...... H04L 67/16 709/201 |
| 6,665,705 | B1 * | 12/2003 | Daniels-Barnes | ...... H04L 29/06 709/203 |
| 7,016,964 | B1 * | 3/2006 | Still | .................... H04L 63/0281 709/203 |
| 2002/0181460 | A1 * | 12/2002 | Strathmeyer | ............ H04L 29/06 370/389 |
| 2003/0154306 | A1 * | 8/2003 | Perry | ................ H04L 29/12009 709/245 |
| 2004/0006615 | A1 * | 1/2004 | Jackson | ........................ 709/223 |
| 2008/0082642 | A1 * | 4/2008 | Wu | .................... H04L 29/12783 709/222 |
| 2008/0091812 | A1 * | 4/2008 | Lev-Ran et al. | ............... 709/223 |
| 2008/0267144 | A1 * | 10/2008 | Jano | ..................... H04L 67/2819 370/338 |
| 2010/0217841 | A1 * | 8/2010 | Schneider | ...................... 709/220 |
| 2010/0217847 | A1 * | 8/2010 | Cook | ................ H04L 29/12584 709/222 |
| 2012/0072608 | A1 * | 3/2012 | Peters et al. | ................... 709/231 |

FOREIGN PATENT DOCUMENTS

KR 2009/0017899 A * 2/2009 ............ H04W 88/18

* cited by examiner

*Primary Examiner* — Kostas Katsikis
(74) *Attorney, Agent, or Firm* — Rothwell, Figg, Ernst and Manbeck, P.C.

(57) ABSTRACT

A method is provided for automatically exchanging network service provider information between two sets of network service providers. The method comprises configuring at least one address of a proxy function of a second set of network service providers for a proxy function of a first set of network service providers; sending network service provider information of the first set of network service providers to the proxy function of the second set of network service providers with the at least one address of the proxy function of the second set of network service providers; and receiving network service provider information of the second set of network service providers from the proxy function of the second set of network service providers. The network service provider information includes information for addressing the network service provider and ID of service provided by the network service provider.

28 Claims, 4 Drawing Sheets

METHOD AND NODE FOR AUTOMATICALLY EXCHANGING NETWORK SERVICE PROVIDER INFORMATION

TECHNICAL FIELD

This subject matter described herein relates to communication among network elements. More specifically, the subject matter relates to methods and nodes for automatically exchanging information among network service providers in two sets.

BACKGROUND

Both in a wired or wireless network, it is common that a set of network elements need to communicate with another set of network elements with some particular information. For example, in a 3GPP network, traffic detection function (TDF) needs to exchange information with content delivery network (CDN). The information can include, for example, the type or ID (identification) of the service provided by the servers in CDN.

Traffic detection function, based on packet inspection, is applied in a network to support policy and charging control for services. For this end, it needs to exchange information with content delivery network.

A content delivery network can comprise a set of servers, which are disposed at certain network locations on the Internet. These network locations correspond to geographic locations that have been determined to be proximate to a large number of Internet users, thus they are physically close to a large number of Internet users. Delivering content from these servers in a content delivery network is thus quick and affordable.

To establish communication between two sets of network elements, the commonly adopted mechanism is manual configuration and maintenance. FIG. 1 shows an example of a 3GPP network. Service data are transmitted between user equipment (UE), eNB(evoved Node B), packet gateway (PGW), traffic detection function, content delivery network or public data network (PDN) as the real lines show. And signaling data are exchanged among policy and charging rules function (PCRF), PGW, TDF and CDN as the dashed lines show. It should be noted that although FIG. 1 shows PDN and CDN as two separate blocks, CDN can be part of PDN, which refers to Internet.

According to current practice, to realize communication between a server in TDF and a server in CDN, both servers shall be manually configured with address information with regard to each other. The configuration also should be manually maintained. This means, if there is any change to one server, e.g. IP address of a server in CDN changes, the address information of this server, which is recorded in a configuration file of servers in TDF that can communicate with this server in CDN, should be updated.

The manner of manual configuration is not desirable because it requires a manual operator or a user, and this is inefficient. Besides, in the mechanism, the accuracy of the configuration is questionable because the updating process is time consuming.

Hence, there is a need for an improved solution that ensures efficient and reliable communication between two sets of network elements.

SUMMARY

It is the object to obviate at least one of the above indicated disadvantages and provide improved solutions.

A method is provided for automatically exchanging network service provider information between two sets of network service providers. The method comprises the steps of configuring at least one address of a proxy function of a second set of network service providers for a proxy function of a first set of network service providers (s301); sending network service provider information of the first set of network service providers to the proxy function of the second set of network service providers with the at least one address of the proxy function of the second set of network service providers (s302); and receiving network service provider information of the second set of network service providers from the proxy function of the second set of network service providers (s303). The network service provider information includes information for addressing the network service provider and ID of service provided by the network service provider.

According to one aspect of the invention, the first set of network service providers are traffic detection function and the second set of network service provider are content delivery network function, or otherwise, the first set of network service providers are content delivery network function, and the second set of network service provider are traffic detection function.

According to one aspect of the invention, the at least one address comprises one primary address and one secondary address for high availability.

According to one aspect of the invention, the network service provider information further comprises weight and action of network service providers.

According to one aspect of the invention, the action includes initializing, adding, deleting, and modifying.

A method is provided for automatically exchanging network service provider information between two sets of network service providers. The method comprises the steps of receiving network service provider information of a first set of network service providers from a proxy function of the first set of network service providers for a second set of network service providers, wherein at least one address of a proxy function of the second set of network service providers is configured in the proxy function of the first set of network service providers (s401); and sending network service provider information of the second set of network service providers to the proxy function of the first set of network service providers (s402). The network service provider information includes information for addressing the network service provider and ID of service provided by the network service provider.

A node is provided for automatically exchanging network service provider information between two sets of network service providers. The node comprises configuring means configuring for at least one address of a proxy function of a second set of network service providers for a proxy function of a first set of network service providers; sending means for sending network service provider information of the first set of network service providers to the proxy function of the second set of network service providers with the at least one address of the proxy function of the second set of network service providers; and receiving means for receiving network service provider information of the second set of network service providers from the proxy function of the second set of network service providers. The network service provider information includes information for addressing the network service provider and ID of service provided by the network service provider.

A node is provided for automatically exchanging network service provider information between two sets of network service providers. The node comprises receiving means receiving network service provider information of a first set of network service providers from a proxy function of the first set of network service providers for a second set of network service providers, wherein at least one address of a proxy function of the second set of network service providers is configured in the proxy function of the first set of network service providers; and sending means for sending network service provider information of the second set of network service providers to the proxy function of the first set of network service providers. The network service provider information includes information for addressing the network service provider and ID of service provided by the network service provider.

With the present invention, the communication process between two sets of network elements can be more efficient.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

A detailed description is now provided with reference to the accompanying drawings. One skilled in the art may realize that the following description is illustrative only and is not in any way limiting. Other embodiments of the present invention may readily suggest themselves to such skilled persons having the benefit of this disclosure.

The process of automatically exchanging network service provider information will be particularly described with reference to IP address. However, it will be understood by one skilled in the art that the mechanism may straightforwardly be adapted to other address system, providing in such address system, the location of different elements in a network can be distinguished by the address information in this address system.

According to one embodiment, there are two sets of network service providers in a network, i.e. set I and set II. The services provided by the network service providers can include conversational service, streaming service, interactive service, and background service. The network service providers can be implemented in servers. It may be needed for each one of the network service providers in one set to communicate with network service providers in the other set.

Figure 1:
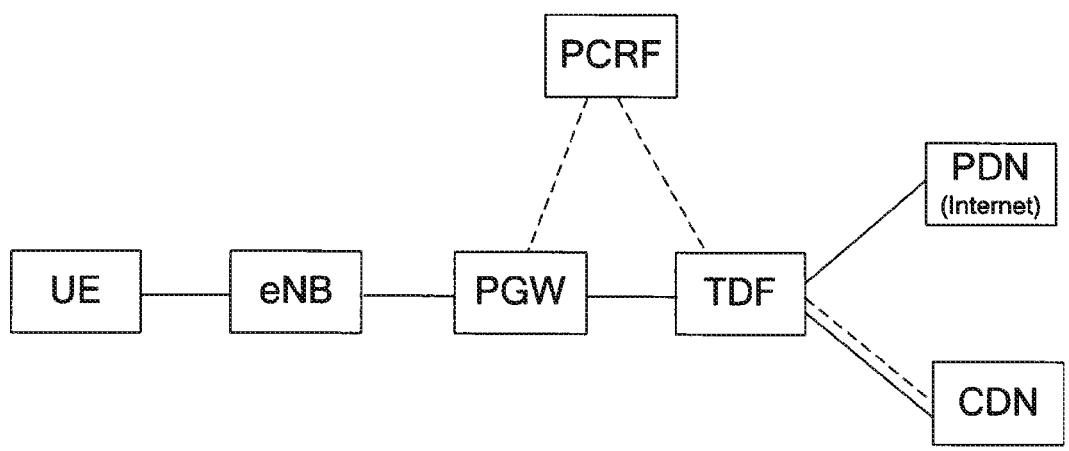
FIG. 1 illustrates some network elements in a 3GPP network.
Figure 2:
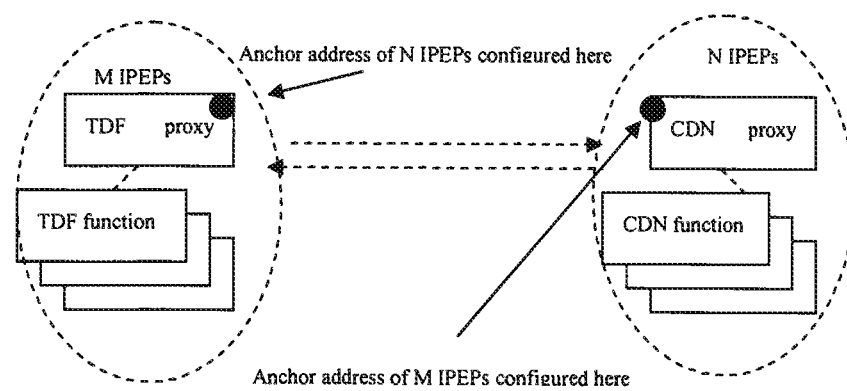
FIG. 2 illustrates proxy functions in TDF and CDN.

To facilitate the information exchange process, a proxy mechanism is introduced. Specifically, a proxy function is provided for set I and set II, respectively. The proxy function can be implemented by one of the servers in a set, specifically a circuit board in the server. Network service provider information of all the network service providers in a set is maintained in the proxy function of the set. A proxy function has its own address information, including IP address and port number. The IP address of the proxy function is that of the server that the proxy function resides. The port number of the proxy function is the number of the port that provides proxy function. FIG. 2 illustrates an example for proxy function in TDF and CDN. The address of a proxy function is shown as anchor address, which refers to IP address and port number.

The information exchange process starts with a manual configuration step (step one). However, compared with the traditional overall manual configuration method, this manual configuration step is simple because in this step, only the address information of the proxy function is involved. In this step, the proxy function of a set (set II) of network service providers is manually configured in the proxy function of the other set (set I).

Then the process proceeds to the next step (step two). With the knowledge about address information of set II's proxy function, network service provider information of all the network service providers of set I can be sent to the proxy function of set II. The sent information also include address information of set I's proxy function.

After that, the process proceeds to the final step (step three). With the knowledge about address information of set I's proxy function, network service provider information of all the network service providers of set II can be sent to the proxy function of set I.

After these steps, each one of the network service providers in set I have access to network service providers in set II and can obtain intended information about network service providers in set II. Likewise, each one of the network service providers in set II have access to network service providers in set I and can obtain intended information about network service providers in set I.

Preferably, there could be two proxy functions for each set of service providers. Both of the two proxy functions maintain information about all of the servers in its set. According to this arrangement, in the manual configuration step, two addresses are manually configured. One of the two proxy function is determined to be the primary proxy function and its address is defined as primary address. The other proxy function is determined to be the secondary proxy function and its address is defined as a secondary address. Occasionally some servers may break down. If this happens to be the case for a server that the primary proxy function resides, the secondary server can take over the process. The two proxy functions are distinguished by IP address and their port numbers can be the same or be different.

According to one embodiment, in aforementioned step one, not only the proxy function of set II is manually configured in the proxy function of set I, but also the proxy function of set I is manually configured in the proxy function of set II. Step 2 and step 3 in this embodiment are the same as those in the first embodiment. The advantage of this arrangement is that it obtains the flexibility to initiate the information exchange process either from set I or set II.

Figure 3:
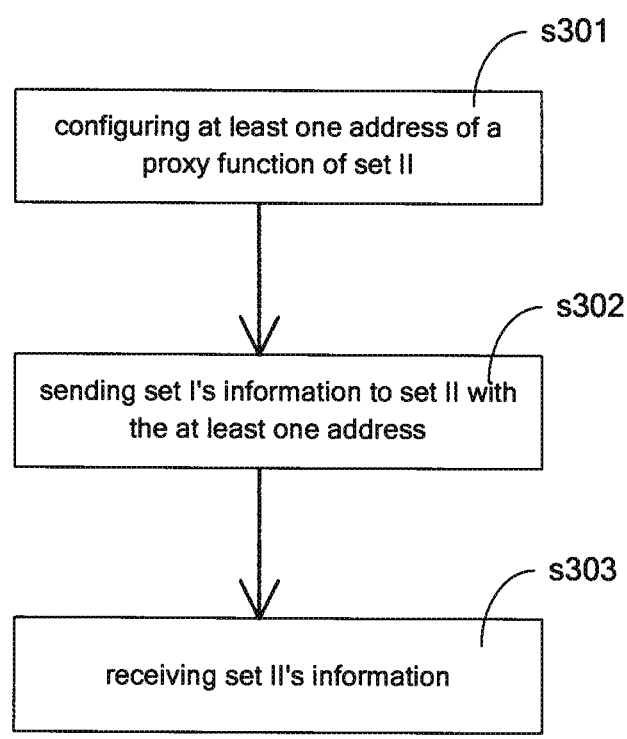
FIG. 3 illustrates a flowchart of an information exchange process according to one embodiment.

FIG. 3 illustrates the information exchange process between two sets of network service providers from the perspective of the set that initiates the information exchange process.

In step s301, at least one address of a proxy function of set II of network service providers is configured in a proxy function of set I of network service providers. The configuration process can be performed by a network administrator or an operator. The address can include IP address of the server that the proxy function resides and port number that operates for the proxy function. After this configuration step, the address of the proxy function of set II is stored in the form of a configuration file in the proxy function of set I.

In step s302, network service provider information of the set I of network service providers is sent to the proxy function of set II of network service providers. The destination of the sending process is just the address of the proxy function of set II. The network service provider information includes information for addressing the network service provider and ID of service provided by the network service provider. For some cases, the network service provider information can further comprise weight and action of network service providers. The action can include, for example, initializing, adding, deleting, and modifying. When the action is adding or modifying of some network service providers, the network service provider information can additionally include new information for addressing the changed service providers.

In step 303, network service provider information of set II of network service providers is sent from the proxy function of the set II of network service providers to the proxy function of the set I of network service providers.

According to one embodiment, the first set of network service providers are traffic detection function, and the second set of network service provider are content delivery network function. Alternatively, the first set of network service providers are content delivery network function, and the second set of network service provider are traffic detection function. In either case, it is important for a network service provider to know the type of service or ID of service provided by the network service provider in another set which it communicates with.

The aforementioned process is also applicable to the communication among other network elements. For example, TDF may be not presented, and in this case, packet gateway (PGW) needs to exchange information with CDN directly. With TDF being replaced by PGW, this process also works. The first set of network service providers are packet gateway, and the second set of network service provider are content delivery network function. Alternatively, the first set of network service providers are content delivery network function, and the second set of network service provider are packet gateway. In summary, according to one embodiment, the TDF can be replaced by the PGW and this also holds for the following embodiments.

Figure 4:
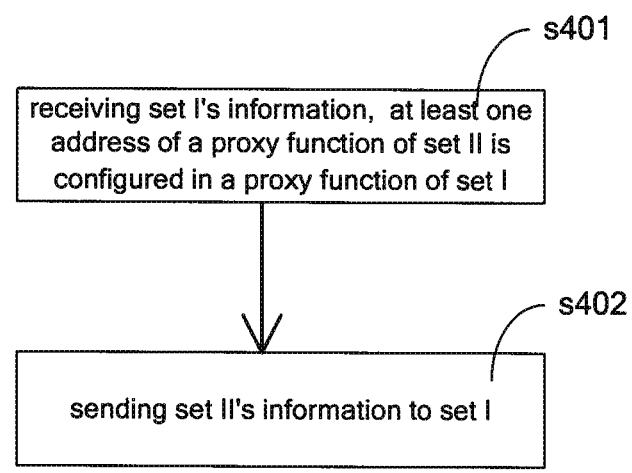
FIG. 4 illustrates a flowchart of an information exchange process according to another embodiment.

FIG. 4 illustrates the information exchange process between two sets of network service providers from the perspective of the set of the service providers that receives the initiation from the other set.

In step 401, network service provider information of a first set of network service providers is received at the proxy function of a second set of network service providers. This step can be realized because at least one address of a proxy function of the second set of network service providers is configured in the proxy function of the first set of network service providers.

In step 402, network service provider information of the second set of network service providers is sent to the proxy function of the first set of network service providers.

The aforementioned processes can be implemented in network nodes. In one embodiment, there provides a node for automatically exchanging network service provider information between two sets of network service providers. The node comprises configuring means, sending means, and receiving means. The configuring means configuring is for at least one address of a proxy function of a second set of network service providers for a proxy function of a first set of network service providers. The sending means is for sending network service provider information of the first set of network service providers to the proxy function of the second set of network service providers with the at least one address of the proxy function of the second set of network service providers. The receiving means is for receiving network service provider information of the second set of network service providers from the proxy function of the second set of network service providers. The network service provider information includes information for addressing the network service provider and ID of service provided by the network service provider.

In another embodiment, there provides a node for automatically exchanging network service provider information between two sets of network service providers. The node comprises receiving means and sending means. The receiving means is for receiving network service provider information of a first set of network service providers from a proxy function of the first set of network service providers for a second set of network service providers, wherein at least one address of a proxy function of the second set of network service providers is configured in the proxy function of the first set of network service providers. The sending means is for sending network service provider information of the second set of network service providers to the proxy function of the first set of network service providers. The network service provider information includes information for addressing the network service provider and ID of service provided by the network service provider.

Although the present disclosure has been described with exemplary embodiments, various changes and modifications may be suggested to one skilled in the art. It is intended that the present disclosure encompasses such changes and modifications as fall within the scope of the appended claims.

The invention claimed is:

1. A method performed in a network node for automatically exchanging network service provider information between two sets of network service providers, the method comprising:

the network node configuring at least one address of a second proxy function of a second set of network service providers for a first proxy function of a first set of network service providers;

the network node sending first network service provider information of the first set of network service providers to the second proxy function of the second set of network service providers with at least one address of the first proxy function; and the network node receiving second network service provider information of the second set of network service providers from the second proxy function of the second set of network service providers, wherein the first network service provider information includes information for addressing a first server within the first set of network service providers and an ID of a service provided by the first set of network service providers, and wherein the at least one address of the first proxy function is used if the at least one address of the second proxy function is unavailable.

2. The method of claim 1, wherein the first set of network service providers are traffic detection function, and the second set of network service provider are content delivery network function.

3. The method of claim 1, wherein the first set of network service providers are content delivery network function, and the second set of network service provider are traffic detection function.

4. The method of claim 1, wherein the at least one address comprises one primary address and one secondary address for high availability.

5. The method of claim 1, wherein the address comprises IP address and port number.

6. The method of claim 1, wherein the proxy function resides in a network service provider of the set to which it belongs.

7. The method of claim 1, wherein the first network service provider information further comprises weight and action of the first set of network service providers.

8. The method of claim 7, wherein the action includes initializing, adding, deleting, and modifying.

9. The method of claim 8, wherein the first network service provider information includes new information for addressing when the action is adding or modifying.

10. The method of claim 1, wherein the first network service provider information further comprises control information.

11. The method of claim 1, wherein the first set of network service providers are traffic detection function, and the second set of network service provider are packet data network gateway.

12. The method of claim 1, wherein information for addressing includes IP address and port number.

13. The method of claim 1, wherein the service includes conversational service, streaming service, interactive service, and background service.

14. The method of claim 1, wherein the step of configuring at least one address is performed by a network administrator.

15. The method of claim 1, wherein the first set of network service providers and the second set of network service provider are content delivery network function and packet gateway respectively.

16. The method of claim 1, wherein
the second network service provider information includes information for addressing a second server within the second of network service providers and an ID of a service provided by the second set of network service providers,
sending the first network service provider information comprises the first proxy function sending to the second proxy function said first network service provider information, and
receiving the second network service provider information comprises the first proxy function receiving from the second proxy function said second network service provider information wherein the receiving occurs after the sending.

17. The method of claim 1, further comprising:
after receiving the second network service provider information from the second proxy function, the first proxy function providing at least some of said second network service provider information to said first server.

18. The method of claim 1, wherein the first set of network service providers are connected to a gateway node.

19. The method of claim 18, wherein the services provided by the second set of network service providers include at least one of a conversational service, a streaming service, an interactive service, and a background service.

20. The method of claim 1, wherein the at least one address of the second proxy function is a primary address and the at least one address of the first proxy function is a secondary address, wherein the primary address has higher priority than the secondary address.

21. The method of claim 20, wherein the secondary address is used if the primary address is unavailable.

22. The method of claim 1, wherein the second network service provider information includes information for addressing a first server within the second set of network service providers and an ID of a service provided by the second set of network service providers.

23. The method of claim 1, wherein the second network service provider information further comprises weight and action of second set of network service providers.

24. The method of claim 23, wherein the action includes initializing, adding, deleting, and modifying.

25. The method of claim 1, wherein the network node stores, in the first set of network service providers, a configuration file containing the at least one address of the second proxy function.

26. A method for automatically exchanging network service provider information between a first network service provider server having a first proxy function and a second network service provider server having a second proxy function, the method comprising:
the second network service provider server receiving, at the second proxy function receiving from the first proxy function first network service provider information of the first network service provider including at least one address of the first proxy function, wherein at least one address of the second proxy function is configured in the first proxy function; and
the second network service provider server sending second network service provider information of the second network service provider to the first proxy function, wherein
the first network service provider information includes information for addressing the first network service provider and an ID of a service provided by the first network service provider, and
the second network service provider information includes information for addressing the second network service provider and an ID of a service provided by the second network service provider, and
wherein the at least one address of the first proxy function is used if the at least one address of the second proxy function is unavailable.

27. A node for automatically exchanging network service provider information between two sets of network service providers, the node arranged to configure for at least one address of a second proxy function of a second set of network service providers for a first proxy function of a first set of network service, the node comprising:
a transmitter for sending first network service provider information of the first set of network service providers to the second proxy function of the second set of network service providers with at least one address of the first proxy function; and
a receiver for receiving second network service provider information of the second set of network service providers from the second proxy function of the second set of network service providers, wherein
the first network service provider information includes information for addressing a first server within the first set of network service providers and ID of a service provided by the first set of network service providers, and
wherein the at least one address of the first proxy function is used if the at least one address of the second proxy function is unavailable.

28. A node for automatically exchanging network service provider information between two sets of network service providers, comprising:
a receiver for receiving network service provider information of a first set of network service providers including at least one address of a proxy function of the first set of network service providers for a second set of network service providers, wherein at least one address of a proxy function of the second set of network service providers is configured in the proxy function of the first set of network service providers; and a transmitter for sending network service provider information of the second set of network service providers to the proxy function of the first set of network service providers, wherein the network service provider information includes information for addressing the network service provider and ID of service provided by the network service provider, and wherein the at least one address of the proxy function of the first set of network service providers is used if the at least one address of the proxy function of the second set of network service providers is unavailable.

* * * * *